US010764551B2

(12) United States Patent
Ma et al.

(10) Patent No.: US 10,764,551 B2
(45) Date of Patent: Sep. 1, 2020

(54) METHOD FOR CONFIGURING IMAGE-RECORDING SETTINGS

(71) Applicant: AVerMedia TECHNOLOGIES, INC., New Taipei (TW)

(72) Inventors: Hsiang-Yi Ma, New Taipei (TW); Pin-Feng Chiu, New Taipei (TW); Nian-Ying Tsai, New Taipei (TW); Po-Yang Yao, New Taipei (TW); Chia-Hung Liu, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 16/372,430

(22) Filed: Apr. 2, 2019

(65) Prior Publication Data
US 2019/0335152 A1 Oct. 31, 2019

(30) Foreign Application Priority Data

Apr. 30, 2018 (TW) .............................. 107114737 A

(51) Int. Cl.
| | | |
|---|---|---|
| *H04N 9/79* | (2006.01) | |
| *G11B 27/36* | (2006.01) | |
| *G11B 27/034* | (2006.01) | |
| *H04N 19/12* | (2014.01) | |
| *H04N 21/433* | (2011.01) | |
| *H04N 5/76* | (2006.01) | |

(52) U.S. Cl.
CPC ......... *H04N 9/7921* (2013.01); *G11B 27/034* (2013.01); *G11B 27/36* (2013.01); *H04N 19/12* (2014.11)

(58) Field of Classification Search
None
See application file for complete search history.

(56) References Cited

U.S. PATENT DOCUMENTS

2017/0105042 A1* 4/2017 Toma ..................... H04N 5/765
2019/0230273 A1* 7/2019 Min ..................... H04N 5/2351

* cited by examiner

*Primary Examiner* — Hung Q Dang
(74) *Attorney, Agent, or Firm* — CKC & Partners Co., LLC

(57) ABSTRACT

A method for configuring image-recording settings includes receiving an image source, determining whether the image source is the high dynamic range (HDR) image. If a HDR image source is received, a step is performed for determining whether a recording device supports recording an image with a HDR format, and a step is performed for adding a HDR recording option if the recording device supports recording the image with the HDR format.

13 Claims, 1 Drawing Sheet

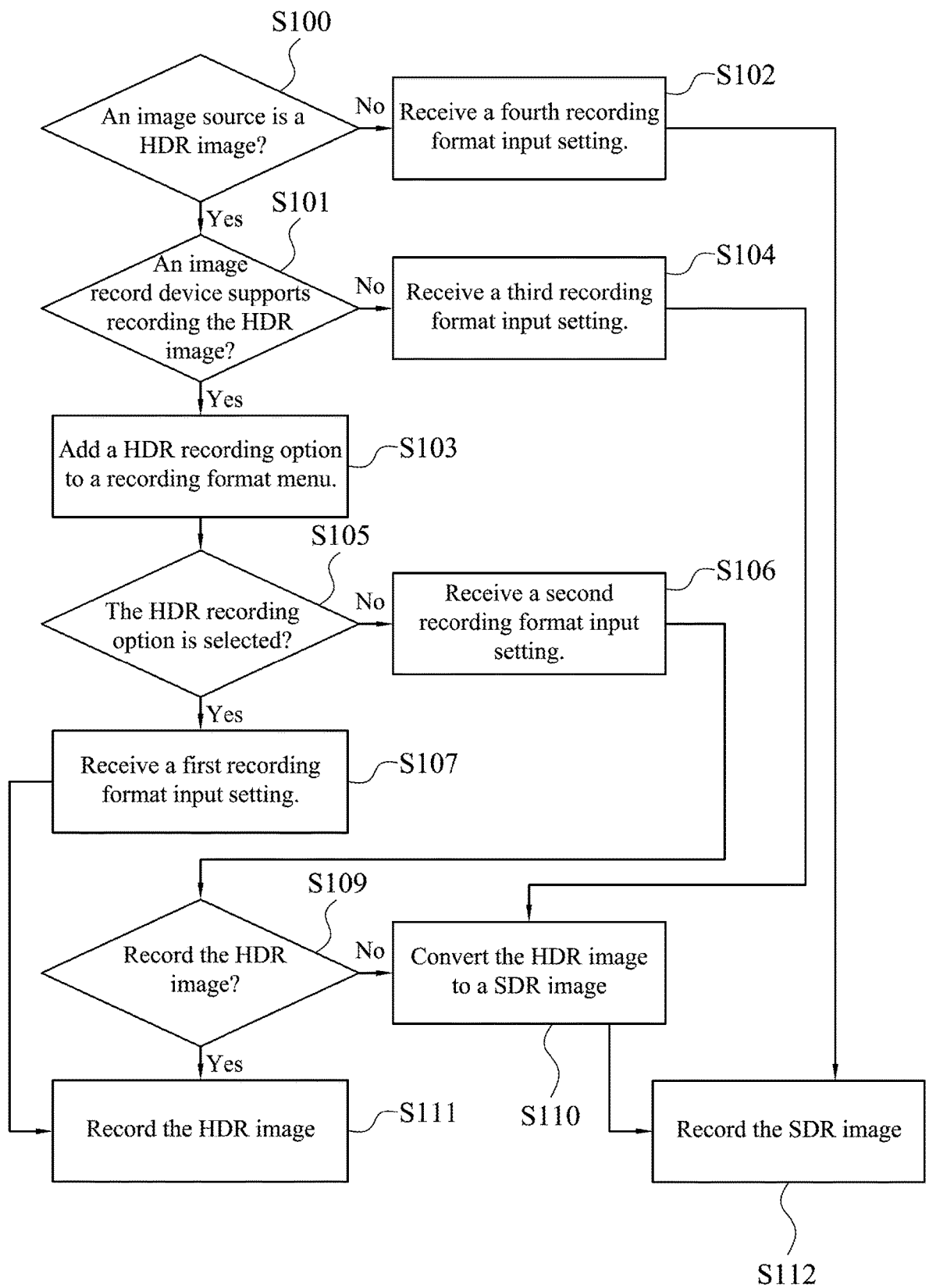

METHOD FOR CONFIGURING IMAGE-RECORDING SETTINGS

CROSS-REFERENCE TO RELATED APPLICATION

This application claims priority to Taiwan Application Serial Number 107114737, filed Apr. 30, 2018, which is herein incorporated by reference in its entirety.

BACKGROUND

Field of Invention

The present invention relates to a method for configuring image-recording settings. More particularly, the present invention relates to a method for configuring image-recording settings which is applied to record an image or a video with a high dynamic range (HDR) image format.

Description of Related Art

Nowadays, an image or a video with a high dynamic range (HDR) format has been widely accepted by front-end image source devices. For example, a PlayStation 4 (PS4) host is able to output and support a video game with a HDR format.

However, some recording devices still do not support HDR recording and cause recording abnormalities, such as slow recording speed, device down, or incorrect image-recording format.

SUMMARY

The invention provides a method for configuring image-recording settings, thereby preventing abnormalities from occurring during image recording when the recording device does not support image recording with a high dynamic range (HDR) format.

According to an embodiment of the disclosure, the method for configuring image-recording settings includes receiving a HDR image, determining whether a recording device supports recording an image with a HDR format, and adding a HDR recording option if the recording device supports recording the image with the HDR format.

In an embodiment of the disclosure, adding the HDR recording option includes adding the HDR recording option to a recording format menu.

In an embodiment of the disclosure, prior to receiving the HDR image, the method further includes obtaining an image source, and determining whether the image source provides the HDR image.

In an embodiment of the disclosure, adding the HDR recording option includes displaying at least one of a HDR recording button, a HDR recording toggle, a HDR recording checkbox, and a HDR recording enable button on an user interface.

In an embodiment of the disclosure, the method further includes determining whether the HDR recording option is selected.

In an embodiment of the disclosure, the method further includes receiving a first recording format input setting if the HDR recording option is selected.

In an embodiment of the disclosure, the first recording format input setting is generated according to a performance specification of the recording device.

In an embodiment of the disclosure, after receiving the first recording format input setting, the HDR image is recorded according to the received first recording format input setting.

In an embodiment of the disclosure, the method further includes determining whether to record the HDR image, and recording the HDR image according to the received first recording format input setting if the HDR image is determined to be recorded.

In an embodiment of the disclosure, the method further includes receiving a second recording format input setting if the HDR recording option is unselected.

In an embodiment of the disclosure, after receiving the second recording format input setting, the method further includes converting the HDR image into a standard dynamic range (SDR) image, and recording the SDR image according to the second recording format input setting.

In an embodiment of the disclosure, determining whether the recording device supports recording the image with the HDR format includes determining whether the recording device supports a high-performance image encoding format.

In an embodiment of the disclosure, the high-performance image encoding format includes H.265 Main 10 image encoding format or H. 264 High 10 image encoding format.

Accordingly, the method of the present disclosure determines whether the recording device supports recording the image with the HDR format when the recording device receives the HDR image. If the recording device supports recording the image with the HDR format, the HDR recording option is added to the user interface. Therefore, the recording abnormalities are prevented if the recording device does not support recording the HDR format.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a flow chart of a method for configuring image-recording settings according to an embodiment of the disclosure.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 is a flow chart of a method for configuring image-recording settings according to an embodiment of the disclosure. As shown in FIG. 1, an intelligent method for generating recording settings for recoding a high dynamic range (HDR) image includes step S100 to step S112. For convenience, the "high dynamic range image" is abbreviated as the "HDR image" and the "standard dynamic range image" is abbreviated as "SDR image" hereinafter.

In some embodiments, the intelligent method for configuring image-recording settings can be a build-in function of an image capturing device. In other embodiments, the intelligent method can be implemented by a related image processing software or hardware. The disclosure should not be limited in this regard.

Step S100 is performed to determine whether an image source provides a HDR image. In some embodiments, an image capturing device obtains an image source, and the image capturing device determines whether the obtained image source provides a HDR image. If the obtained image source provides a HDR image, step S101 is performed.

In some embodiments, the image capturing device may be a computer device, a frame grabber, or the like. The disclosure should not be limited in this regard. In addition, the obtained image source may provide a stream of signal including image frames, such as image signals or video signals, but the disclosure should not be limited in this regard. Furthermore, the image source may provide a HDR image or a non-HDR image. In some embodiments, the non-HDR image may be a SDR image. In the following embodiments, the non-HDR image will take the SDR image for exemplary illustration, but the disclosure should not be limited in this regard.

When the image source provides the HDR image, step S101 is performed to further determine whether a recording device supports recording an image with a HDR format. If the recording device supports recording the image with the HDR format, step S103 is performed; otherwise, if the image recording device does not support recording the image with the HDR format, step S104 is performed.

In some embodiments, the recording device may be a personal computer with image processing abilities, a video recorder, an image recording platform, or any suitable image recording device, but the disclosure should not be limited in this regard.

In some embodiments, the HDR format includes, for example, Dolby Vision, HDR 10, HDR 10+, HLG format. Whether the recording device supports recording the image with the HDR format can be determined by checking whether the recording device supports the high-performance video encoding format, such as, H.265 Main 10 video encoding format, or H.264 High 10 video encoding format, or by checking an image processing performance of the recording device, but the disclosure should not be limited in this regard.

When the recording device supports recording the image with the HDR format, a HDR recording option is added on an user interface in step S103. The HDR recording option may be presented in different manners according to actual needs. For example, the HDR recording option may be one of a HDR recording button, a HDR recording toggle, a HDR recording checkbox, and a HDR recording enable button which is displayed on the user interface. The word "adding" herein means that, for example, an option which is not originally shown on the user interface is generated later. In other embodiments, the "adding" means that the option is shown in a dark color before adding and turns into a bright color option after the adding. In some embodiments, the user interface may be presented by voice or human-machine interface, but the disclosure should not be limited in this regard. In other embodiment, the HDR recording option is added into a recording format menu. In some embodiments, the recording format menu includes a drop-down menu, a button menu, a check-list menu, or the like, but the disclosure should not be limited in this regard.

On the other hand, when the recording device does not support recording the image with the HDR format, the recording device receives a third recording format input setting for subsequent image recording in step S104. In some embodiments, step S110 and step S112 are performed sequentially next to step S104. That is, the image is converted from the HDR image to a non-HDR image, e.g., SDR image, and then the non-HDR image is recorded. In the embodiment, the third recording format input setting can be an original recording format input setting currently used by the recording device, the recording format input setting which is set by the user, or the recording format input setting for other image recording. The parameters of the third recording format input setting may include, for example, a bit depth of compression, a compression format, an image input format, a resolution, a frame update rate (Frame/Rate), and/or the like, but the disclosure should not be limited in this regard. In some embodiments, the third recording format input setting can be designed and presented through the human-machine interface according to actual needs. In another embodiment, the third recording format input setting can be presented, for example, by voice or by display. In other embodiment, there is no need for the user to see the third recording format input setting, but the disclosure should not be limited in this regard. After the third recording format input setting is received, the third recording format input setting is used as a recording setting for subsequent image recording.

In some embodiments, when the recording device does not support recording the image with the HDR format, a message may be displayed on a display to remind the user that the recording device does not support recording the image with the HDR format. In other embodiments, the recording device receives the third recording format input setting without showing the message to remind the user. The disclosure should not be limited in this regard.

Step 105 is performed next to step S103. Step S105 is performed to determine whether the HDR recording option is selected. In some embodiments, if the HDR recording option is selected, for example, by the user, step S107 is performed next to step S105. If the HDR recording option is not selected, step S106 is performed next to step S105.

When the HDR recording option is selected, the recording device receives a first recording format input setting for subsequent image recording in step 107. In the embodiment, the first recording format input setting may be automatically generated according to a performance specification of the recording device, or according to a specification of the input image source. The first recording format input setting can be the same as or different from the original recording format input setting which is currently used by the recording device. The parameters of the first recording format input setting may include, for example, a bit depth of compression, a compression format, an image input format, a resolution, a frame update rate (Frame/Rate), and/or the like, but the disclosure should not be limited in this regard. In the embodiment, the first recording format input setting may be, for example, that the bit depth of the expected compression (bit depth) is 10 bits, the expected compression format is HEVC, and the image input format is P010 (10 bit). In other words, the user who is not good at setting the HDR recording format can select the HDR recording option to generate a set of recording format setting for recording the HDR image. In some embodiments, the first recording format input setting can be designed and presented through the human-machine interface according to actual needs. In another embodiment, the first recording format input setting can be presented, for example, by voice or by display. In other embodiment, there is no need for the user to see the first recording format input setting, but the disclosure should not be limited in this regard.

On the other hand, when the HDR recording option is unselected, the recording device receives a second recording format input setting in step 106. Then, the method proceeds to step S109.

In some embodiments, when the HDR recording option is unselected, the message may be displayed on the display to remind the user that the recording device will record the image with the second recording format input setting. In other embodiments, the recording device receives the second recording format input setting without showing the message to remind the user. The disclosure should not be limited in this regard. In the embodiment, the second recording format input setting can be the original recording format input setting currently used by the recording device, the recording format input setting which is set by the user, or the recording format input setting for other image recording. The parameters of the second recording format input setting may include, for example, a bit depth of compression, a compression format, an image input format, a resolution, a frame update rate (Frame/Rate), and/or the like, but the disclosure should not be limited in this regard. In some embodiments, the second recording format input setting can be designed and be presented through the human-machine interface according to actual needs. In another embodiment, the second recording format input setting can be presented, for example, by voice or by display. In other embodiment, there is no need for the user to see the second recording format input setting, but the disclosure should not be limited in this regard. After the second recording format input setting is received, the second recording format input setting is used as a recording setting for subsequent image recording.

Step S109 is performed to determine whether to record the image with the HDR format. In the embodiment, whether to record the image with the HDR format can be determined by using a variety of information according to actual needs. For example, it can be determined according to the determination results of the foregoing steps (e.g., S101/S103/S105), or according to the set content of the recording format input setting. For example, if the recording format input setting is set to 10 bits for the compression bit depth, HEVC for the compression format, and P010 (10 bit) for the image input format, the determination result of step S109 where whether to record the image with the HDR format is yes. On the other hand, if the recording format input setting is set to 8 bits for the compression bit depth, a non-HEVC (for example, H.264) for the compression format, and P010 (10 bit) for the image input format, the determination result of step S109 is no. However, the disclosure should not be limited in this regard.

In the embodiment, whether to record the image with HDR format can be determined according to the parameter of the second recording format input setting in step S109. For example, when the parameter of the second recording format input setting is 10 bits for the compression bit depth, HEVC for the compression format, and P010 (10 bit) for the image input format, the determination result of step S109 where whether to record the image with the HDR format is yes. On the other hand, if the second recording format input setting is set to 8 bits for the compression bit depth, a non-HEVC (for example, H.264) for the compression format, and P010 (10 bit) for the image input format, the determination result of step S109 is no. It is to be noted that, in the embodiment of the FIG. 1, step S111 is performed next to step S107, and step S110 is performed next to step S104, but the disclosure should not be limited in this regard. For example, in some embodiments, step S109 can be performed next to step S107 (not shown). In other embodiments, step S109 can be performed next to step S104 (not shown).

If the determination result of step S109 is yes, step S111 is performed next to step S109; otherwise, if the determination result of step S109 is no, step S110 is performed next to step S109.

In step S111, the recording device records the HDR image.

In step S110, the HDR image is converted into a SDR image. Then, step S112 is performed next to step S110.

In step S112, the recording device records the SDR image. For example, the recording device records the SDR image which is converted from the HDR image in step S110 according to the received recording format input setting as described above. In addition, in some embodiments, the recording device can record the SDR image that has been recognized as a non-HDR image in step S100 according to a recording format input setting.

Refer back to step S100. In step S100, if the determination result is no, that is, the image source is the non-HDR image (for example, a SDR image), step S102 is performed next to step S100. In step S102, the recording device receives a fourth recording format input setting. Then, step S112 is performed to record the SDR image according to the received fourth recording format input setting. The introduction of the fourth recording format input setting can refer to the above description of the second, or third recording format input setting, and thus is not described here again.

It is to be understood that the image recording discussed above may refer to any form of image or video stream production, such as image compression, image capture, image output, image archive, or the like. The disclosure should not be limited in this regard.

Accordingly, the method of the present disclosure determines whether the recording device supports recording the image with the HDR format when the recording device receives the HDR image. If the recording device supports recording the image with the HDR format, the HDR recording option is added to the user interface. Therefore, the recording abnormalities are prevented if the recording device does not support recording the HDR format.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for configuring image-recording settings, comprising:
   receiving a high dynamic range (HDR) image by a recording device;
   determining by an image capturing device whether the recording device supports recording an image with a HDR format; and
   adding a HDR recording option on an user interface if the recording device supports recording the image with the HDR format.

2. The method of claim 1, wherein adding the HDR recording option comprises adding the HDR recording option to a recording format menu.

3. The method of claim 1, wherein prior to receiving the HDR image, the method further comprises:
obtaining an image source; and
determining whether the image source provides the HDR image.

4. The method of claim 1, wherein adding the HDR recording option comprises:
displaying at least one of a HDR recording button, a HDR recording toggle, a HDR recording checkbox, and a HDR recording enable button on the user interface.

5. The method of claim 1, further comprising determining whether the HDR recording option is selected.

6. The method of claim 5, further comprising receiving a first recording format input setting if the HDR recording option is selected.

7. The method of claim 6, wherein the first recording format input setting is generated according to a performance specification of the recording device.

8. The method of claim 6, wherein after receiving the first recording format input setting, the HDR image is recorded according to the received first recording format input setting.

9. The method of claim 6, further comprising:
determining whether to record the HDR image; and
recording the HDR image according to the received first recording format input setting if the HDR image is determined to be recorded.

10. The method of claim 5, further comprising receiving a second recording format input setting if the HDR recording option is unselected.

11. The method of claim 10, wherein after receiving the second recording format input setting, the method further comprises:
converting the HDR image into a standard dynamic range (SDR) image; and
recording the SDR image according to the second recording format input setting.

12. The method of claim 1, wherein determining whether the recording device supports recording the image with the HDR format comprises:
determining whether the recording device supports a high-performance image encoding format.

13. The method of claim 12, wherein the high-performance image encoding format includes H.265 Main 10 image encoding format or H. 264 High 10 image encoding format.

* * * * *